United States Patent
Marioni

(10) Patent No.: US 9,586,648 B2
(45) Date of Patent: Mar. 7, 2017

(54) WHEEL HUB MOTOR FOR AN ELECTRIC BICYCLE AND ELECTRIC BICYCLE COMPRISING SAID WHEEL HUB MOTOR

(71) Applicant: ASKOLL EVA S.R.L., Povolaro di Dueville (IT)

(72) Inventor: Elio Marioni, Dueville (Vicenza) (IT)

(73) Assignee: Askoll Eva S.r.l. (IT)

( * ) Notice: Subject to any disclaimer, the term of this patent is extended or adjusted under 35 U.S.C. 154(b) by 0 days.

(21) Appl. No.: 14/642,019

(22) Filed: Mar. 9, 2015

(65) Prior Publication Data
US 2015/0266542 A1    Sep. 24, 2015

(30) Foreign Application Priority Data
Mar. 18, 2014 (EP) .................................... 14425029

(51) Int. Cl.
*B60K 7/00* (2006.01)
*B62M 6/65* (2010.01)
(Continued)

(52) U.S. Cl.
CPC ............ *B62M 6/65* (2013.01); *B60K 7/0007* (2013.01); *H02K 7/003* (2013.01); *H02K 7/108* (2013.01);
(Continued)

(58) Field of Classification Search
CPC .......... H02K 7/14; H02K 7/116; H02K 7/108; H02K 7/0007; H02K 7/003; H02K 2007/0092; H02K 21/00; H02K 21/02
See application file for complete search history.

(56) References Cited

U.S. PATENT DOCUMENTS

| | | | | |
|---|---|---|---|---|
| 572,036 A | * | 11/1896 | Theryc | H02K 7/14 180/220 |
| 2,514,460 A | * | 7/1950 | Tucker | H02K 7/14 180/10 |

(Continued)

FOREIGN PATENT DOCUMENTS

| | | |
|---|---|---|
| CN | 102 148 557 A | 8/2011 |
| CN | 103307217 A * | 9/2013 |

(Continued)

OTHER PUBLICATIONS

Bert Baker, Helical vs. Straight Cut Gears, IronWorks Magazine, Apr. 2010.*
European Search Report issued in connection with EP 14 42 5029.

*Primary Examiner* — J. Allen Shriver, II
*Assistant Examiner* — Steve Clemmons
(74) *Attorney, Agent, or Firm* — Akerman LLP

(57) ABSTRACT

Wheel hub motor (1) for an electric bicycle, comprising: a fixed shaft (2) which can be associated with a frame of an electric bicycle; a hub shell (3) which is rotatable with respect to said fixed shaft (3) and can be incorporated in a wheel structure (100) of said electric bicycle; an electric motor (4) being housed inside said hub shell (3), said motor having an internal stator (40) rigidly connected to the fixed shaft (2) and an external rotor (41) rotatably movable with respect thereto, and a reduction unit (5) which kinematically connects the rotation of said external rotor (41) to that of said hub shell (3) and which comprises two reduction stages arranged alongside each other in the axial direction inside the hub shell (3): a first reduction stage (50) comprising at least one first pinion (51), rigidly connected to the external rotor (41) and coaxial with the fixed shaft (2) and meshing with at least one first gear (52) rigidly connected to an eccentric shaft (53) mounted on an intermediate member; and a second reduction stage (55) comprising at least one (Continued)

second pinion (56) rigidly connected to said eccentric shaft (53) and meshing with a second gear (57) rigidly connected to said hub shell (3).

15 Claims, 4 Drawing Sheets

(51) Int. Cl.
    *H02K 7/00*     (2006.01)
    *H02K 7/108*    (2006.01)
    *H02K 7/116*    (2006.01)
    *H02K 7/14*     (2006.01)
    *H02K 21/02*    (2006.01)

(52) U.S. Cl.
    CPC .............. *H02K 7/116* (2013.01); *H02K 7/14* (2013.01); *H02K 21/02* (2013.01); *B60K 2007/0092* (2013.01)

(56) References Cited

U.S. PATENT DOCUMENTS

| | | | | |
|---|---|---|---|---|
| 2,773,207 A * | 12/1956 | Budzien | ............... | H02K 21/225 310/153 |
| 3,013,440 A * | 12/1961 | White | ................. | F16H 55/06 29/450 |
| 3,296,471 A * | 1/1967 | Cochardt | ............ | H02K 23/04 310/154.46 |
| 3,812,928 A * | 5/1974 | Rockwell | ............. | B60K 7/0007 105/55 |
| 4,346,777 A * | 8/1982 | Restelli | ................... | B62M 7/12 180/220 |
| 4,901,602 A * | 2/1990 | Matoba | ................... | F16H 1/28 475/331 |
| 6,492,756 B1 * | 12/2002 | Maslov | ................... | B62M 6/45 310/156.12 |
| 8,100,208 B2 * | 1/2012 | Jordan | ................... | B62M 6/65 180/220 |
| 8,357,071 B2 * | 1/2013 | Hino | ..................... | B62M 11/14 475/338 |
| 2002/0125976 A1* | 9/2002 | Bianchi | ................. | H01F 1/117 335/302 |
| 2002/0149282 A1* | 10/2002 | Heidrich | ............... | H02K 1/148 310/216.064 |
| 2006/0287149 A1* | 12/2006 | Mao | ........................ | H02K 1/146 475/5 |
| 2012/0133250 A1* | 5/2012 | Marioni | ................ | H02K 1/148 310/68 R |
| 2015/0148173 A1* | 5/2015 | Kim | ........................ | B62M 6/65 475/149 |
| 2015/0266542 A1* | 9/2015 | Marioni | ................... | H02K 7/14 180/62 |
| 2015/0291256 A1* | 10/2015 | Taitt | ......................... | B62M 6/65 475/2 |

FOREIGN PATENT DOCUMENTS

| | | | | |
|---|---|---|---|---|
| DE | WO 9852817 A1 * | 11/1998 | ............ | B62M 11/18 |
| EP | 1 736 347 A1 | 12/2006 | | |
| JP | 2012 096775 A | 5/2012 | | |

\* cited by examiner

WHEEL HUB MOTOR FOR AN ELECTRIC BICYCLE AND ELECTRIC BICYCLE COMPRISING SAID WHEEL HUB MOTOR

CROSS-REFERENCE TO RELATED APPLICATIONS

The present application claims priority to European Patent Application No. 14425029.7, filed Mar. 18, 2014, the entirety of which is incorporated herein by reference.

FIELD OF APPLICATION

The present invention relates to a wheel hub motor—namely a wheel hub comprising internally an electric motor and associated reduction means—for an electric vehicle, in particular for a pedal-assisted electric bicycle.

The invention also relates to an electric or pedal-assisted bicycle comprising a wheel hub motor.

The invention may find a useful application in the technological sector of electrical mobility.

PRIOR ART

As is well known, for some years now, following a growing awareness with regard to environmental issues, so-called "zero emission vehicles" (ZEV) have become more widespread. These vehicles in fact are characterized by the fact that they release practically zero polluting emissions into the atmosphere.

In particular the most common zero emission vehicles are electrically propelled transportation means or electric vehicles.

The characteristic feature of electric vehicles is that they have an electric motor which uses as energy source the energy stored in one or more rechargeable batteries and supplied by these to the motor in the form of electric power.

The vehicles of this type, although their widespread use is limited at present by the known problems of battery size and autonomy, achieve a drastic reduction in the operating costs for the user as well as the sought-after zero polluting emissions.

Considering all the electric vehicles, the ones which are least affected by the drawbacks associated with the use of batteries and therefore their autonomy are bicycles since they are used over short distances, have a low weight and require a small amount of power.

It is emphasized that in electric bicycles an electric motor is generally used as an aid and not as a substitute for the pedalling action.

Such bicycles are referred to more correctly as "electric pedal-assisted cycles (EPAC), or also "pedelecs", i.e. bicycles where the human propulsive action is combined with that of an electric motor. The term "e-bike" is also commonly used, although it is broader in meaning since it includes also bicycles in which the motor operates independently of the pedalling action.

A pedal-assisted bicycle is very silent since it does not have any polluting emissions and ensures several tens of kilometers of autonomy with the assistance of the motor, and even more than 150 km in the case of the more sophisticated models, in particular those with lithium batteries, where the work distribution between motor and cyclist is variable and often can be selected by the cyclist.

Hitherto, for the consumer, the main obstacle to acquiring an electric bicycle is its purchase price; this is therefore the main factor which prevents the widespread distribution of electric bicycles and substantially limits the number of potential users.

A factor which is likewise an obstacle to the spread of electric bicycles is their typical bulkiness and awkward handling, mainly due to the positioning of the motors and the batteries and in general their appearance, which is somewhat different from that of conventional non-motorized bicycles.

In the light of the above observations it is therefore important to limit to the minimum possible the overall volume and degree of mechanical complexity of the motor unit and drive system.

A particularly effective technical solution in this connection is the incorporation of the motor unit inside one of the wheel hubs of the vehicle, namely the design of a wheel hub motor which avoids the use of an external motor with a respective drive chain.

It is clear how such a constructional design gives rise to major weight and dimensional constraints in respect of the motor unit: both the electric motor and any reduction unit must in fact be completely housed inside a small-size shell.

On the other hand, the reduction of production costs imposes constraints of a different kind. If in effect permanent-magnet synchronous motors are without doubt preferable for the applications in the sector owing to their high torque density, in recent times their use has fallen owing to the dramatic increase in the cost of rare earths, which are conventionally used for their production.

In order to maintain competitive prices, manufacturers have thus been obliged to resort to alternative heavier and larger-volume solutions, such as an asynchronous motor or excited-rotor synchronous motor, to the detriment of the compactness of the motor unit.

The aforementioned constraints are even greater in the case where the hub motor is to be mounted on the front wheel; in this case, in fact, an excessive weight penalizes in an unacceptable manner the manoeuvrability of the vehicle.

On the other hand, precisely the incorporation of the hub motor in the front wheel is desirable since it allows greater control of the traction and optimum balancing of the masses, with the weight of the motor which counterbalances that of the cyclist sat on the saddle.

It is also pointed out how the incorporation in the hub motor of a reduction unit with small dimensions and satisfactory transmission ratio has proved to be difficult. In particular, the hub motors produced hitherto have at best an epicyclic reduction gear with a transmission ratio which cannot go below a value of 1:7. The resultant torques for the user are of the order of 20-25 N·m, while a higher torque would allow better control of the traction.

The technical problem of the present invention is that of devising a wheel hub motor for an electric bicycle which has structural and functional characteristics such as to overcome the limitations and drawbacks which hitherto affect the wheel hub motors produced according to the prior art, in particular having a configuration which is particularly compact and a satisfactory internal reduction ratio, without an excessive increase in the costs for production thereof.

SUMMARY OF THE INVENTION

The aforementioned technical problem is solved by a wheel hub motor for an electric bicycle, comprising: a fixed shaft which can be associated with an electric bicycle frame; a hub shell which is rotatable with respect to said fixed shaft and can be incorporated in a wheel structure of said electric bicycle; an electric motor being housed inside said hub shell, said motor having an internal stator rigidly connected to the fixed shaft and an external rotor rotatably movable with respect thereto, and a reduction unit which kinematically connects the rotation of said external rotor to that of said hub shell. The reduction unit comprises two reduction stages arranged alongside each other in the axial direction inside the hub shell: a first reduction stage comprising at least one first pinion, rigidly connected to the external rotor and coaxial with the fixed shaft and meshing with at least one first gear rigidly connected to an eccentric shaft mounted on an intermediate member; and a second reduction stage comprising at least one second pinion rigidly connected to said eccentric shaft and meshing with a second gear rigidly connected to said hub shell.

A person skilled in the art will realize immediately how the above-described reduction unit, comprising the two reduction stages arranged alongside each other, is able to achieve transmission ratios which are substantially smaller than those of the epicyclic reduction gears used in the art, while maintaining an overall structure which is compact and compatible with housing inside the hub shell.

In particular, the transmission ratio provided by the reduction unit may be between 1:14 and 1:20, for example 1:17, while the transmission ratios of the hub motors according to the prior art are at the most equal to 1:7.

Obviously, the diameters and the number of teeth of the wheels and the pinions may be chosen by the person skilled in the art in accordance with the specific reduction requirements. In particular, it is clear how the first pinion has preferably a diameter and number of teeth smaller than those of the first gear, which has a diameter and number of teeth greater than those of the second pinion, which in turn has a diameter and number of teeth smaller than those of the second gear.

The second gear is preferably an internally toothed gear which is directly associated with a support surface of the hub shell.

The intermediate member is preferably a rocker, which supports the eccentric shaft at the end of a first of its arms; at the opposite end of the other arm it may advantageously have a counterweight.

Instead, the intermediate member may have alternative constructional forms, for example it may consist of a planetary gearing with a plurality of arms carrying a respective plurality of second gears, in a configuration similar to that of a sun-and-planetary gear system.

The intermediate member is preferably rotationally constrained to the fixed shaft in at least one direction, for example by means of a freewheel.

The aforementioned arrangement of a freewheel arranged in between allows disengagement of the motor in the event of the wheel having a speed greater than that imparted to the rotor.

On the other hand, such a constructional form, although advantageous from a first aspect, has the drawback of preventing regeneration, which is theoretically possible where the electric motor used is a synchronous motor.

In alternative variants which envisage the possibility of regeneration the intermediate member is constrained to the fixed shaft by means of a friction clutch or it is constrained rigidly in both directions of rotation.

At least one of the first pinion and the first gear of the first reduction stage may be advantageously made, at least in the region of the meshing surface, of plastic material.

This measure limits the production costs without negatively affecting the mechanical strength of the system since the relatively low torques transmitted by the first reduction stage do not require the use of materials with a high mechanical strength.

On the other hand, the second pinion and the second gear of the second stage are preferably made, at least in the region of their meshing surface, of metallic material, for example steel.

The first gear may in particular have a peripheral portion made of plastic material co-moulded onto a bush made of metallic material, so as to provide an efficient interface between the transmission portion made of plastic and the transmission portion made of metal.

The first pinion and the first gear may form a helical gearing, while the second pinion and the second gear are preferably of the straight-toothed type. Thus, an efficient reduction in the noisiness is achieved only in the first stage of the reduction gear, where the angular speeds at play are relatively high. Owing to the differentiation of the gears it is possible advantageously to provide the helical torque on only the plastic gears, avoiding the much greater costs of metal machining.

The electric motor is preferably a synchronous electric motor, the external rotor comprising a permanent magnet moulded using plastoferrite.

Such a motor, which is made at a low cost owing to a simple moulding and injection operation for the stator, while never having found an application in the specific sector of electrical mobility, has obvious cost-related advantages compared to conventional rare-earth motors.

In order to maximise the efficiency of the motor, the internal stator may have a plurality of poles provided with shaped pole shoes made of sintered magnetic material, for example SMC (soft magnetic composites).

The aforementioned technical problem is also solved by an electric bicycle comprising at least one wheel hub motor of the type described above.

In view of the particular characteristic compactness of the hub motor described above, its use on the front wheel of a pedal-assisted electric bicycle appears to be particularly advantageous.

Moreover, the same hub motor may be applied to the rear wheel or to the both the wheels. In this latter case it is possible to envisage a main motor and a secondary motor in a master/slave type configuration.

Further characteristic features and advantages of the present invention will emerge from the description, provided hereinbelow, of a preferred example of embodiment provided by way of a non-limiting example with reference to the accompanying drawings.

DETAILED DESCRIPTION

Figure 1:
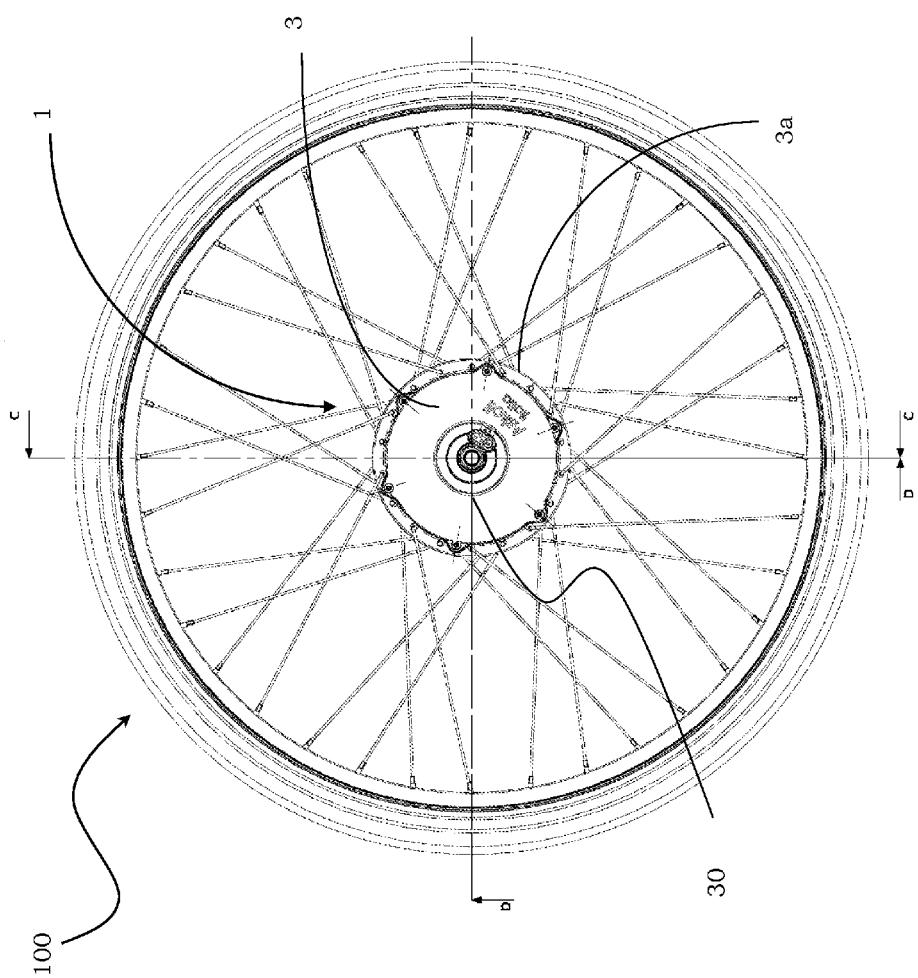
FIG. 1 shows a side view of an electric bicycle wheel comprising a hub motor according to the present invention.

With reference to the attached FIG. 1 is used to denote generically a wheel hub motor designed to be incorporated in an electric bicycle, in particular of the pedal-assisted type.

With reference to the attached FIG. 1, this hub motor 1 can be incorporated in a known manner in a wheel structure 100 of an electric bicycle, preferably a front wheel.

The hub motor 1 comprises a fixed shaft 2, the opposite threaded ends of which are designed to be rigidly associated, in a non-rotatable manner, with a portion of the frame of the electric bicycle; in particular, in the preferred case of a front wheel hub motor 1 presently described, said fixed shaft 2 is associated with the front fork of the vehicle.

The fixed shaft 2 is covered by a shell 3 for the hub which is rotatable with respect to the latter and defines a substantially cylindrical box-like body. Two lateral flanges 3a provided with fastening points for the spokes of the front wheel 100 extend out beyond the external periphery of the hub shell 3.

The hub shell 3 is composed, in particular, of a metal drum provided with a removable side cover 30 which allows access to the internal components of the hub motor. The wall of the metal drum situated opposite the side cover 30 is rotatably mounted, via a bearing arranged in between, on the fixed shaft 2.

An electric motor 4, in the case in question a permanent-magnet synchronous electric motor, is associated with the fixed shaft 2 in the ways described below. The electric motor 4 is composed of an internal stator 40 and an external rotor 41.

The internal stator 40 has twelve poles defined by sets of radial laminations 40a around which electric windings W are wound. Sintered end elements made of SMC (soft magnetic composites) and forming the pole shoes 40b are positioned on the outer end of each of the sets of laminations 40a.

The internal stator 40 is rigidly locked onto the fixed shaft 2 by means of a sleeve 42 provided with a coupling bush 42a which in this embodiment is made of steel and co-injected in the body of the aluminium sleeve and which is engaged in a non-rotatable manner onto a respective portion of the fixed shaft 2 provided with at least one flattened portion.

The internal stator 40 is in particular locked laterally with respect to the internal volume of the hub shell, in the vicinity of the side cover 30.

The sleeve 42 protrudes laterally from the hub shell 3; an electric cable C extends from the outer portion of the sleeve and powers the windings W of the electric motor 4. The side cover 30 is rotatably mounted, by means of a bearing, on top of a wall portion defined by the sleeve 40.

It can be noted that the internal stator 40 extends partially projecting from the base formed by the sleeve 42; here, in the gap between the internal stator 40 and the fixed shaft 2, a rotatable support-piece 43 is inserted, said support-piece being mounted on bearings and provided with a flange, lateral with respect to the internal stator 40, which supports the external rotor 41.

Said external rotor 41 comprises a main cup-shaped body, the bottom of which is screwed onto the aforementioned flange of the rotatable support-piece 43 and the edge of which surrounds the periphery of the internal stator 40. The inner surface of the edge of the external rotor 41, facing the air-gap, supports a magnetic ring 44 which is made of plastoferrite injected using thermoplastic moulding (injection moulding) techniques.

The electric motor 4 is kinematically connected to the hub shell 3 by means of a reduction unit 5 which comprises a first reduction stage 50 and a second reduction stage 55.

The first reduction stage 50 consists of the gearing formed by a first pinion 51, rigidly connected to the external rotor 41, and a first gear 52 with a number of teeth greater than that of the first pinion 51, so as to determine a reduction of the movement output by the electric motor 4.

The first pinion 51 is an externally toothed sleeve which is passed through by the fixed shaft 2, coaxial therewith, and which has at an axial end a coupling flange screwed onto the opposite flange of the rotatable support-piece 43 via the aforementioned bottom of the external rotor 41.

The second gear 52 is instead a gear wheel keyed onto an eccentric shaft 53 which in turn is rotatably mounted, by means of a ball bearing 53a, on an intermediate member which consists of a rocker 54. The rocker 54 is passed through at an intermediate point thereof by the fixed shaft 2 to which it is connected by means of a freewheel 58. The rocker 54 supports the eccentric shaft 53 at one of its ends, while the opposite end, which is shaped in the manner of a hammer head 59, performs the function of a counterweight.

It can be noted that the first pinion 51 and the first gear 52 define a helical-tooth gearing, in particular with an inclination of about 20 degrees. Owing to the use of a helical-tooth gearing it is possible to reduce the noisiness of the first reduction stage 50 in which the angular speeds are relatively high.

The first pinion 51 is made entirely of steel; the first gear 52 has part of the body and the said toothing made of plastic material co-moulded onto an underlying metal sleeve for coupling with the shaft 53. The use of plastic for the meshing surfaces of the first reduction stage 50 is justified by the relatively small value of the torques transmitted in this stage.

The second reduction stage 55 consists of the gearing formed by a second pinion 56 which is also keyed onto the eccentric shaft 53 on the opposite side of the rocker 54 to the first gear 52, and a second internally toothed gear 57 which is rigidly connected to the hub shell 3.

The second gear 57 is in particular coupled with a circular bracket formed on the inner wall of the side wall of the metal drum which defines the hub motor 3.

The second gear 57 clearly has a number of teeth greater than that of the second pinion 56 so as to cause a further reduction of the movement.

The gearing in this case has straight teeth and both the second pinion 56 and the second gear are made of metallic material, preferably steel. In this stage in fact the noisiness no longer constitutes a problem because of the relatively low speed of rotation of the components, while the high torque requires that the meshing surfaces have a suitable strength.

Figure 2:
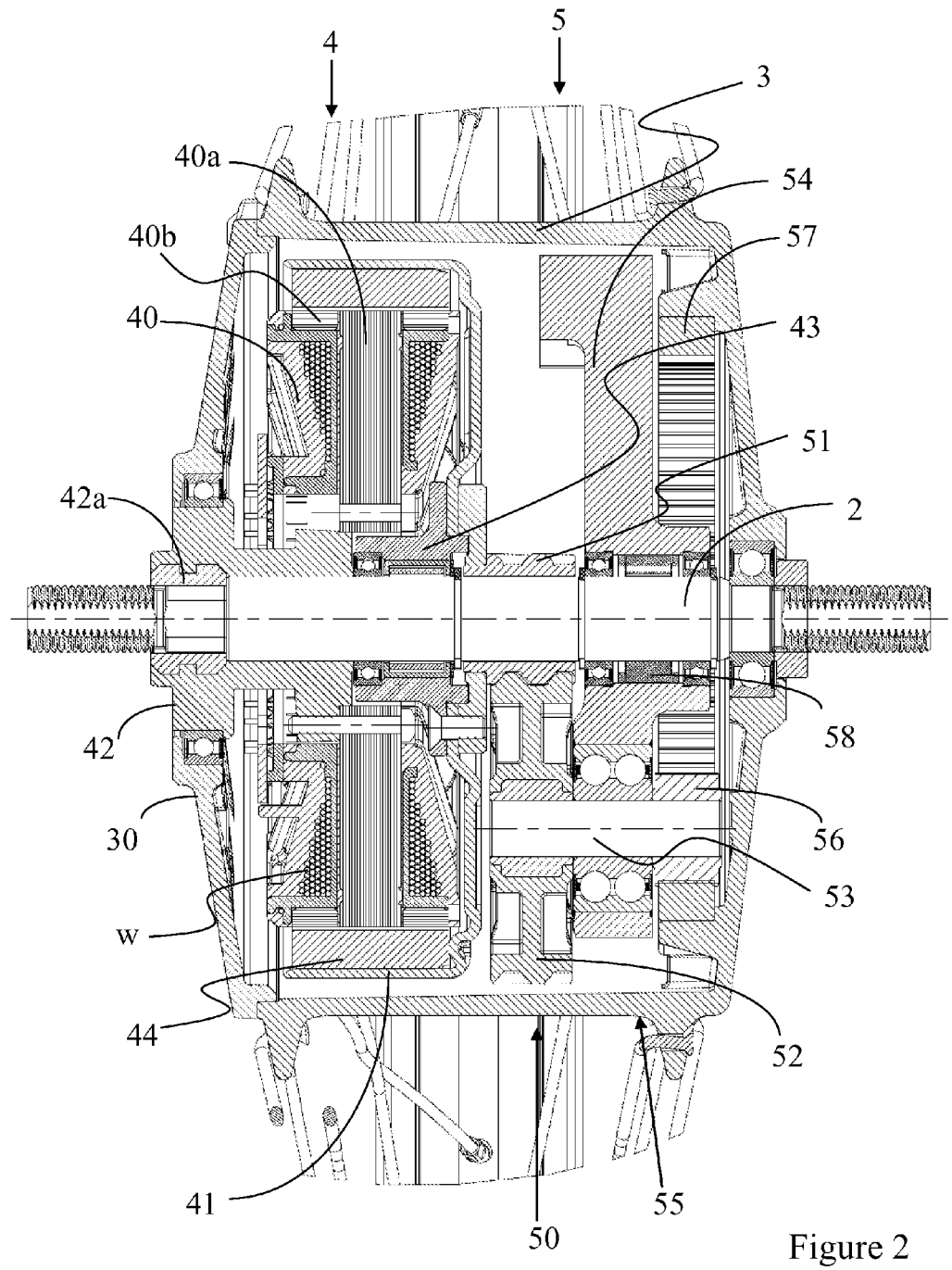
FIG. 2 shows a front view, sectioned along the plane C-C, of the hub motor according to FIG. 1.
Figure 3:
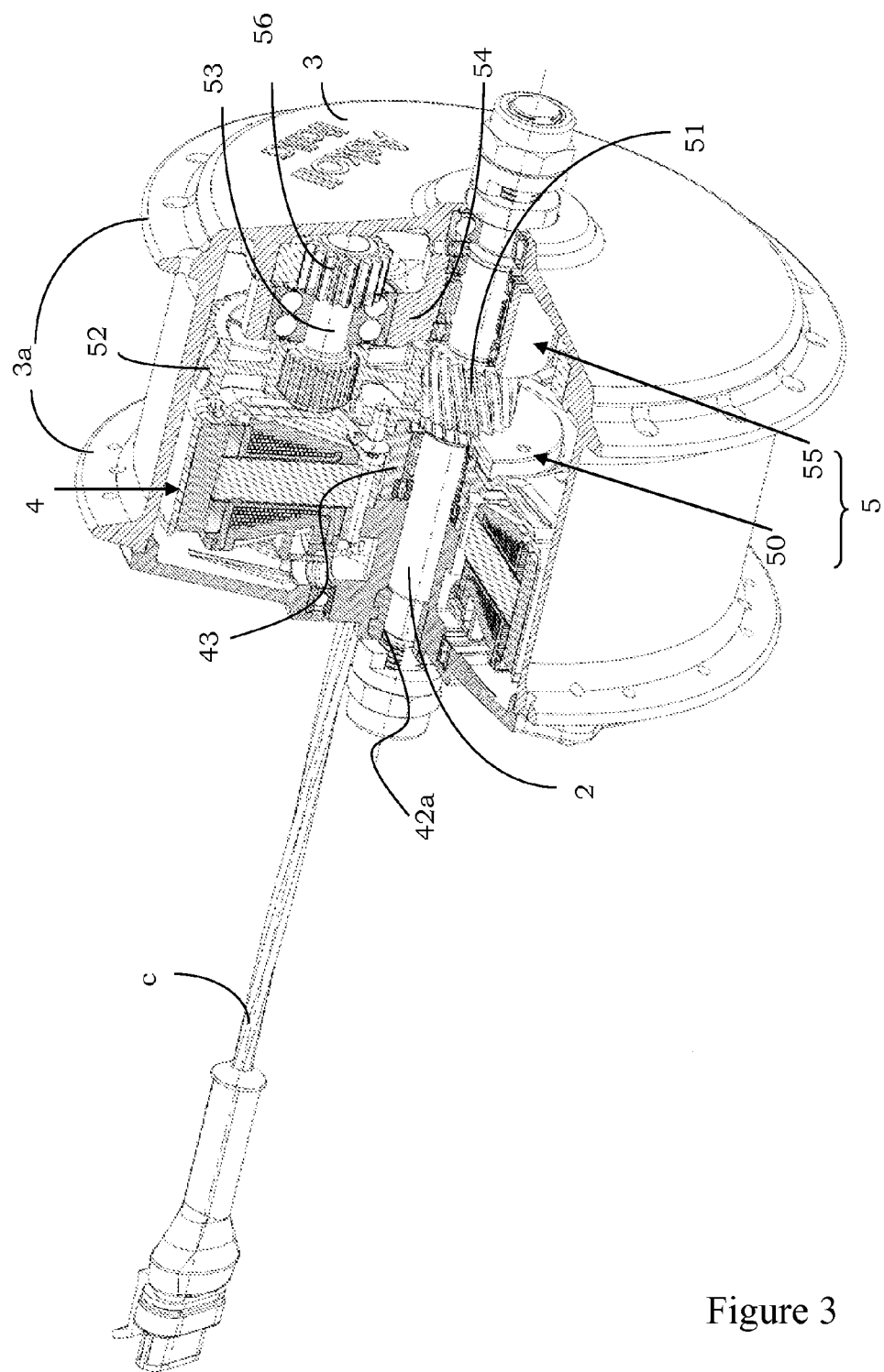
FIG. 3 shows a perspective view, partially sectioned along the plane D-D, of the hub motor according to FIG. 1.
Figure 4:
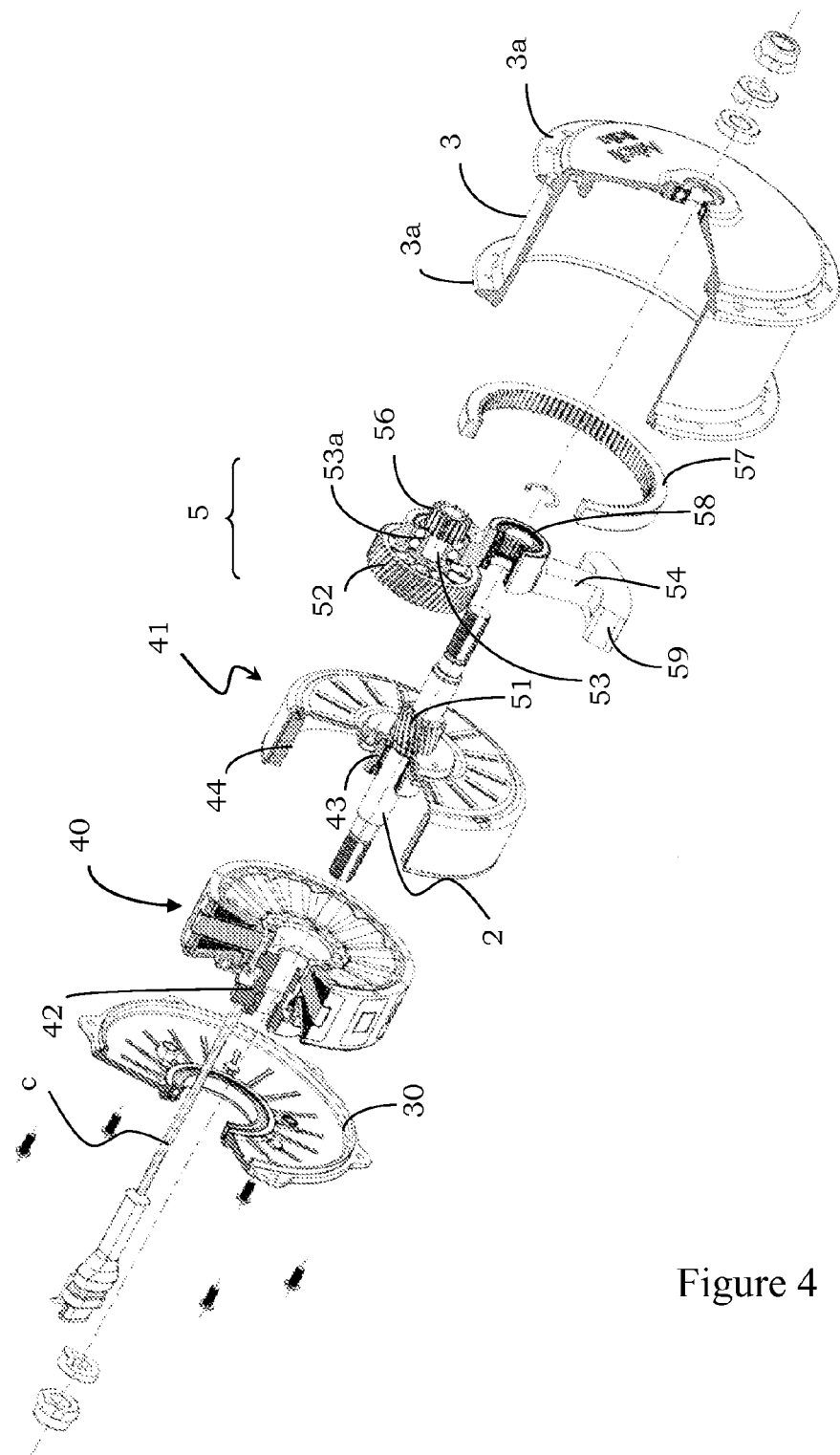
FIG. 4 shows an exploded perspective view of the hub motor according to FIG. 1.

It can be noted that the electric motor 4, the first reduction stage 50 and the second reduction stage 55 are arranged in succession alongside each other along the axial length of the fixed shaft, such as to occupy the entire volume inside the hub shell 3. As can be clearly seen in FIG. 2, the electric motor 4 occupies half of the volume close to the side cover 30, while the other half is occupied by the first reduction stage 50 and by the second reduction stage 55. The rocker 54 is inserted between the two reduction stages 50, 55 and carries, on its opposite sides, the first gear 50 and the second pinion 56.

In operational terms, the electric motor 4 causes a relative rotation of the external rotor 41 and the first pinion 51 associated with it with respect to the coaxial fixed shaft 2. The freewheel 58 is designed to lock in the direction of rotation imparted by the electric motor 4 such that, during the movement, the rocker 54 is locked with respect to the fixed shaft 2 and the movement imparted to the first pinion 51 is entirely transmitted to the first gear 52, from here to the second pinion 56 and then via the second gear 57 to the hub shell 3.

It is pointed out that, if the wheel 100 rotates at a speed greater than that of the electric motor 4—for example in the case of downhill travel—the freewheel 58 rotates idly, disengaging the rocker 54 from the fixed shaft 2. In this case, the relative movement of the wheel 100 with respect to the frame is not transmitted to the external rotor 41, but results in an idle rotation of the rocker 54 about the fixed shaft 2.

Such an embodiment obviously does not allow regeneration by the synchronous electric motor 4; alternative embodiments may envisage the elimination of the freewheel 58 or its replacement with a friction clutch in order to allow also regenerative operation of the motor.

The electric motor 4, which generates an approximate power of 0.35 kW, produces a torque at its output of about 4.1 N·m. Owing to the transmission ratio provided by the double stage system described above, which is roughly about 1:17, a torque of about 50 N·m is supplied to the user. It should be noted that this torque is substantially greater than the torques transmitted in the hub motors with epicyclic reduction gearing known in the art, which reach at the most a torque of 25 N·m.

Obviously the person skilled in the art, in order to meet any specific requirements which might arise, may make numerous modifications and variations to the method and device described above, all of which moreover are contained within the scope of protection of the invention, as defined by the following claims.

The invention claimed is:

1. A wheel hub motor for an electric bicycle, comprising:
   a fixed shaft which can be associated with a frame of an electric bicycle;
   a hub shell, which is rotatable with respect to said fixed shaft, incorporatable in a wheel structure of said electric bicycle;
   an electric motor being housed inside said hub shell, said electric motor having an internal stator rigidly connected to the fixed shaft and an external rotor rotatably movable with respect thereto, and a reduction unit which kinematically connects the rotation of said external rotor to that of said hub shell;
   wherein said reduction unit comprises two reduction stages arranged alongside each other in the axial direction inside the hub shell:
   a first reduction stage comprising at least one first pinion, rigidly connected to the external rotor and coaxial with the fixed shaft and meshing with at least one first gear rigidly connected to an eccentric shaft mounted on an intermediate member;
   and a second reduction stage comprising at least one second pinion rigidly connected to said eccentric shaft and meshing with a second gear rigidly connected to said hub shell, said eccentric shaft traversing said intermediate member, a first portion of the eccentric shaft protruding from a first side of the intermediate member and a second portion of the eccentric shaft protruding from a second side of the intermediate member, said first gear and said second pinion being respectively supported by the first portion and by the second portion of the eccentric shaft.

2. The wheel hub motor according to claim 1, wherein said intermediate member is rotationally constrained to the fixed shaft in at least one direction.

3. The wheel hub motor according to claim 2, wherein said intermediate member is rotationally constrained to the fixed shaft by means of a freewheel.

4. The wheel hub motor according to claim 2, wherein said intermediate member is rotationally constrained to the fixed shaft by means of a friction clutch.

5. The wheel hub motor according to claim 2, wherein said intermediate member is rigidly rotationally constrained to the fixed shaft in both directions.

6. The wheel hub motor according to claim 2, wherein said intermediate member is a rocker which supports the eccentric shaft at the end of a first arm.

7. The wheel hub motor according to claim 6, wherein said rocker has a counterweight at the end of a second arm.

8. The wheel hub motor according to claim 1, wherein at least one of the first pinion and the first gear of the first reduction stage is made, at least in the region of the meshing surface, of plastic material.

9. The wheel hub motor according to claim 8, wherein said second pinion and said second gear are made, at least in the region of their meshing surface, of metallic material.

10. The wheel hub motor according to claim 9, wherein said first gear has a peripheral portion made of plastic material co-moulded onto a sleeve made of metallic material.

11. The wheel hub motor according to claim 1, wherein the first pinion and the first gear form a helical gearing, the second pinion and the second gear being of the straight-tooth type.

12. The wheel hub motor according to claim 11, wherein said internal stator has a plurality of poles provided with shaped pole shoes made of sintered magnetic material.

13. The wheel hub motor according to claim 1, wherein said electric motor is a synchronous electric motor, said external rotor comprising a permanent magnet moulded using plastoferrite.

14. The wheel hub motor according to claim 1, wherein the transmission ratio provided by the reduction unit ranges between 1:14 and 1:20.

15. An electric bicycle comprising at least one wheel hub motor according to claim 1.

* * * * *